United States Patent
Horie et al.

(10) Patent No.: US 6,306,013 B1
(45) Date of Patent: Oct. 23, 2001

(54) METHOD OF PRODUCING POLISHING CLOTH FOR A TEXTURING PROCESS

(75) Inventors: Yuji Horie; Yoshitomo Aoyama, both of Tokyo (JP)

(73) Assignee: Nihon Micro Coating Co., Ltd. (JP)

( * ) Notice: Subject to any disclaimer, the term of this patent is extended or adjusted under 35 U.S.C. 154(b) by 0 days.

(21) Appl. No.: 09/461,994

(22) Filed: Dec. 15, 1999

(51) Int. Cl.[7] .................................................... B24B 1/00
(52) U.S. Cl. ................................................ 451/41; 451/28
(58) Field of Search ........................... 451/28, 526, 532, 451/536, 446, 60, 531; 51/294, 295; 428/92, 91

(56) References Cited

U.S. PATENT DOCUMENTS

| | | | |
|---|---|---|---|
| 3,280,517 | * 10/1966 | Copeland | 451/532 |
| 4,136,221 | * 1/1979 | Okamoto et al. | 428/91 |
| 4,381,805 | * 5/1983 | Troy | 428/92 |
| 4,668,553 | * 5/1987 | Sette et al. | 428/92 |
| 5,396,737 | * 3/1995 | Englund et al. | 451/28 |
| 6,074,284 | * 6/2000 | Tani et al. | 451/28 |

* cited by examiner

*Primary Examiner*—Derris H. Banks
*Assistant Examiner*—Hadi Shakeri
(74) *Attorney, Agent, or Firm*—Coudert Brothers

(57) ABSTRACT

A polishing cloth having a base material of a woven cloth formed by weaving in woven bundles of plastic fibers and its surface layer formed by portions of these woven bundles which are cut and raised from a surface is produced by preparing a woven cloth as its base material by weaving in woven bundles of plastic fibers, cutting portions of these woven bundles over a surface of the woven cloth, and forming a surface layer by raising the cut portions of the woven bundles from a surface.

4 Claims, 5 Drawing Sheets

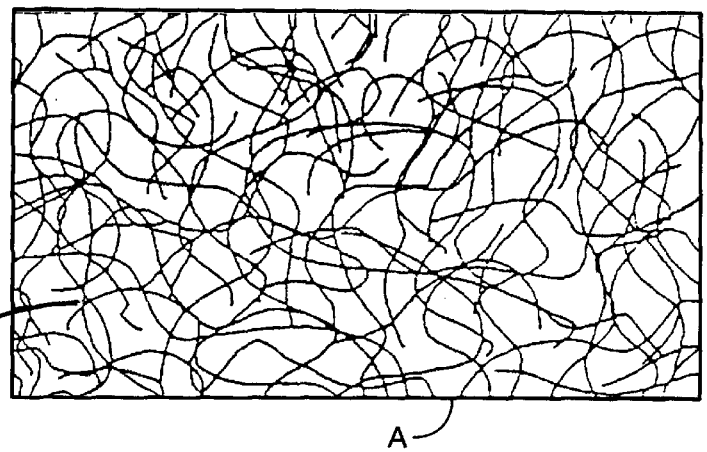
FIG._1a-1
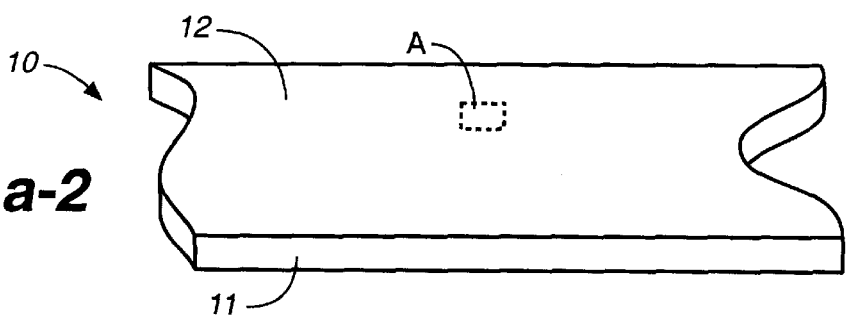
FIG._1a-2
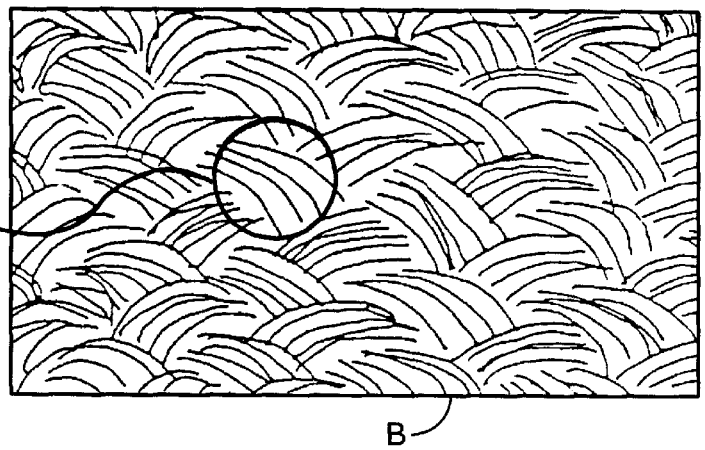
FIG._2a-1
(PRIOR ART)
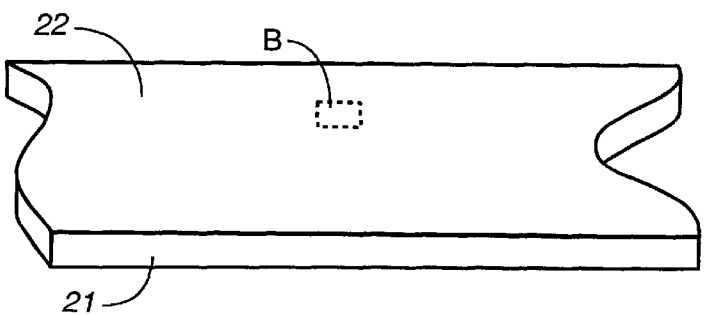
FIG._2a-2
(PRIOR ART)

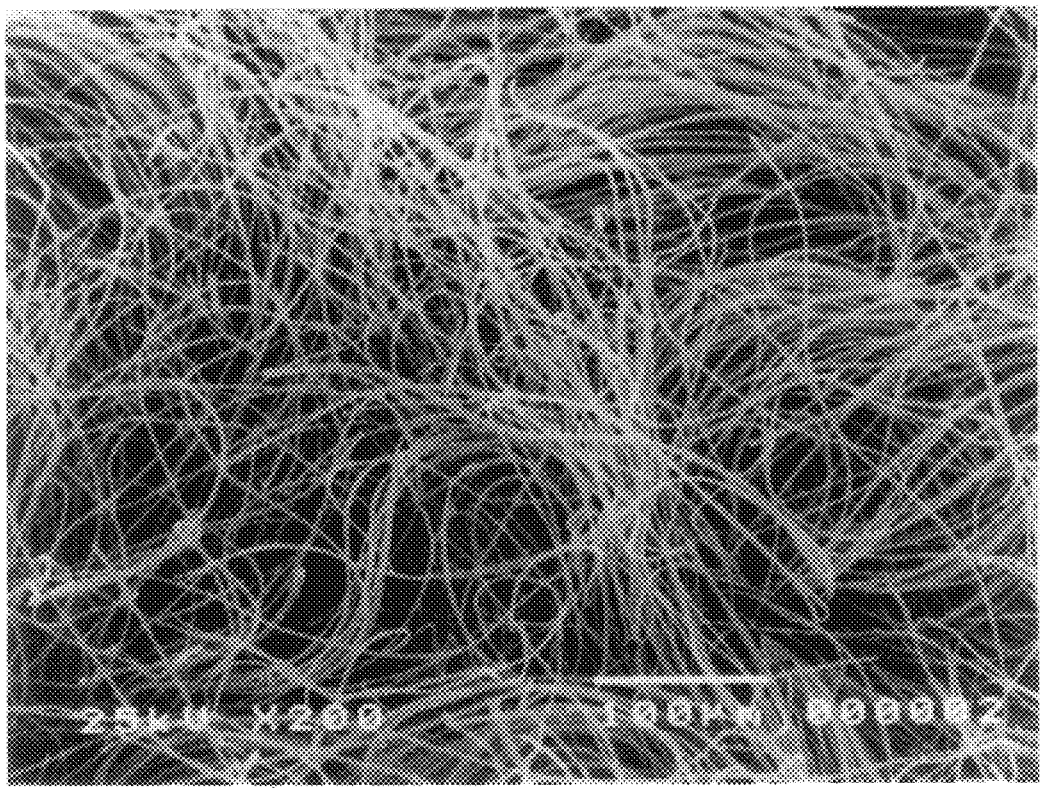
FIG._1b
FIG._2b (PRIOR ART)

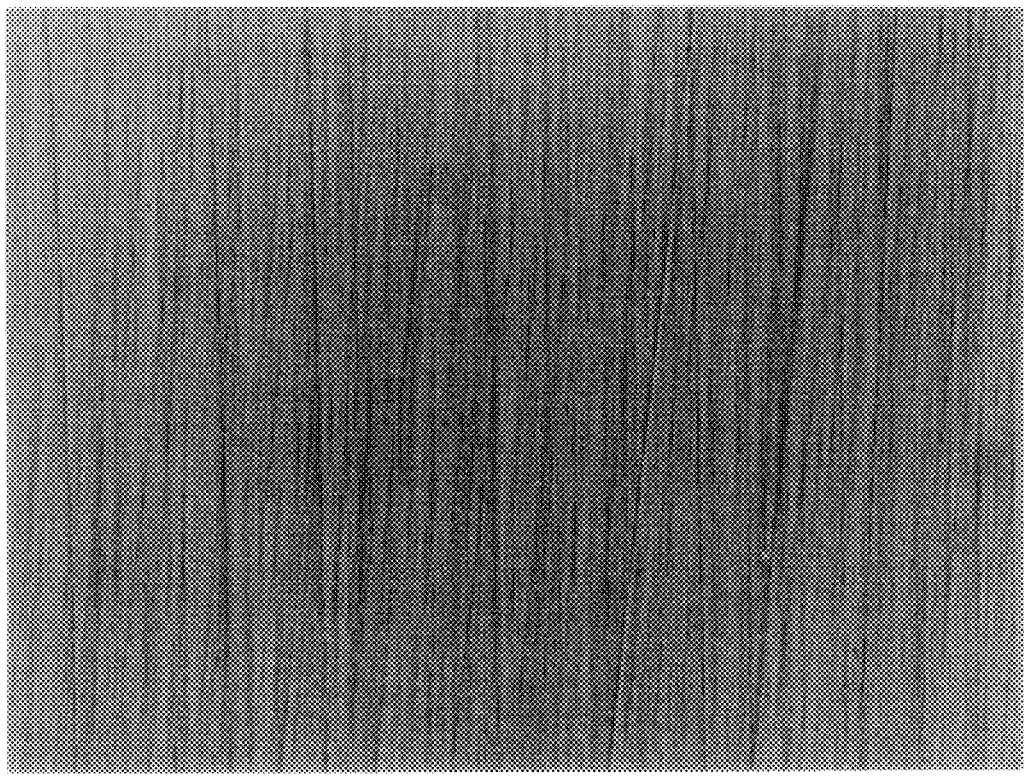
FIG._3a
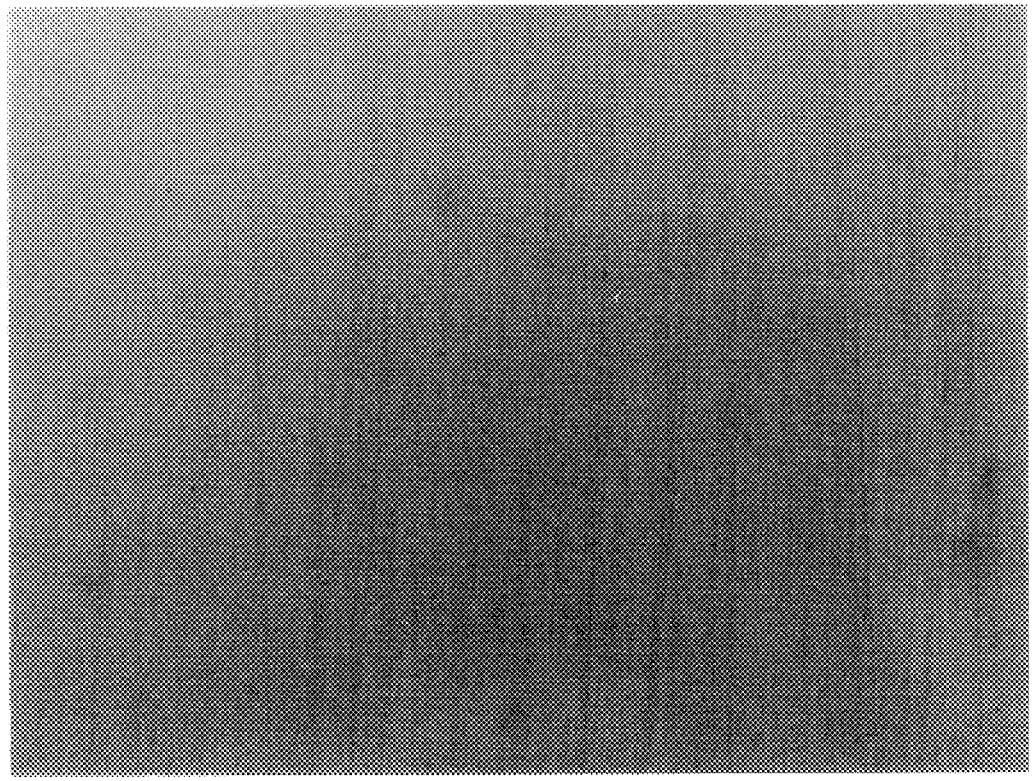
FIG._3b *(PRIOR ART)*

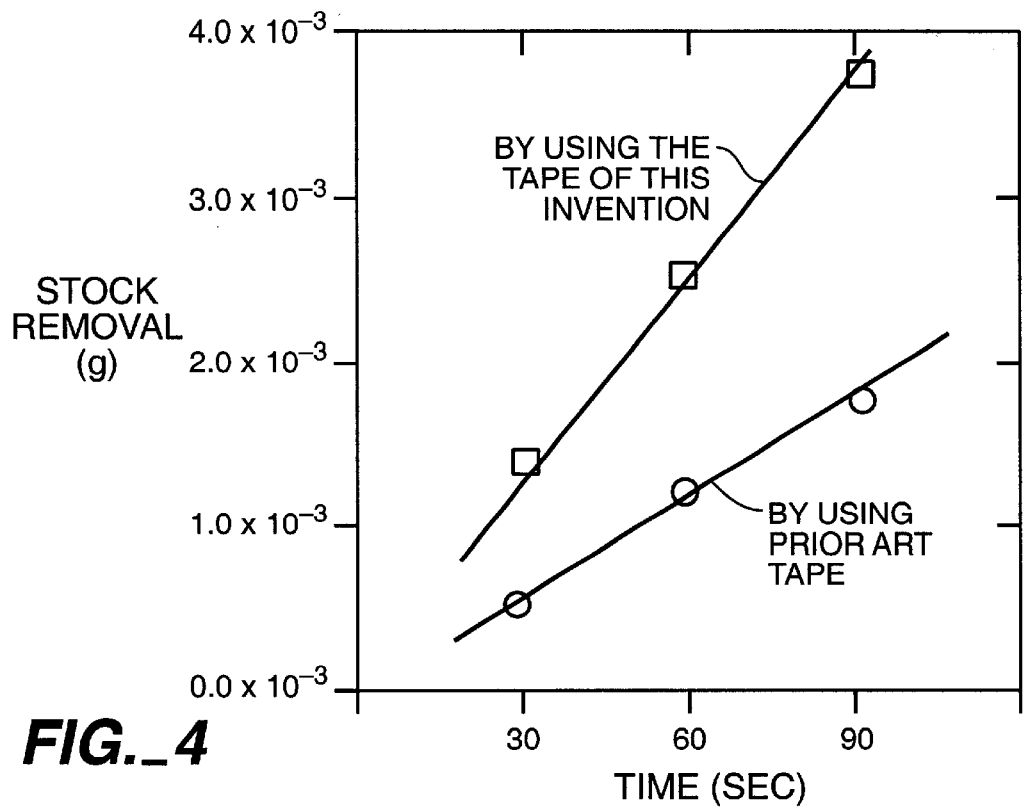
FIG._4
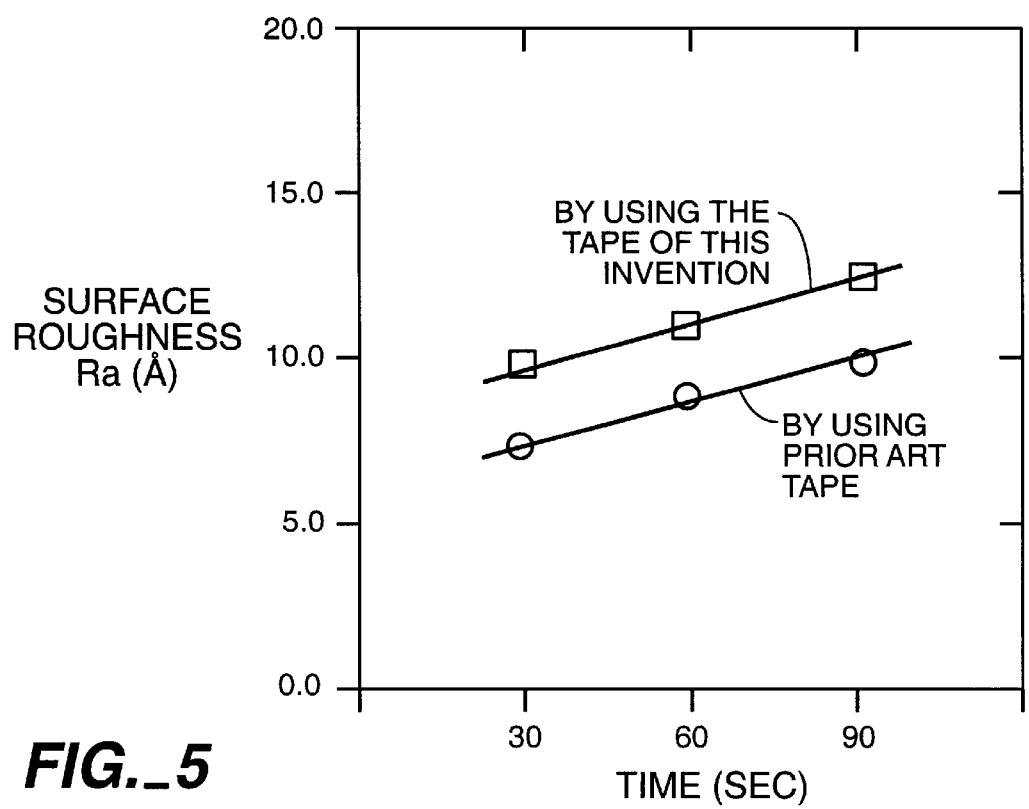
FIG._5

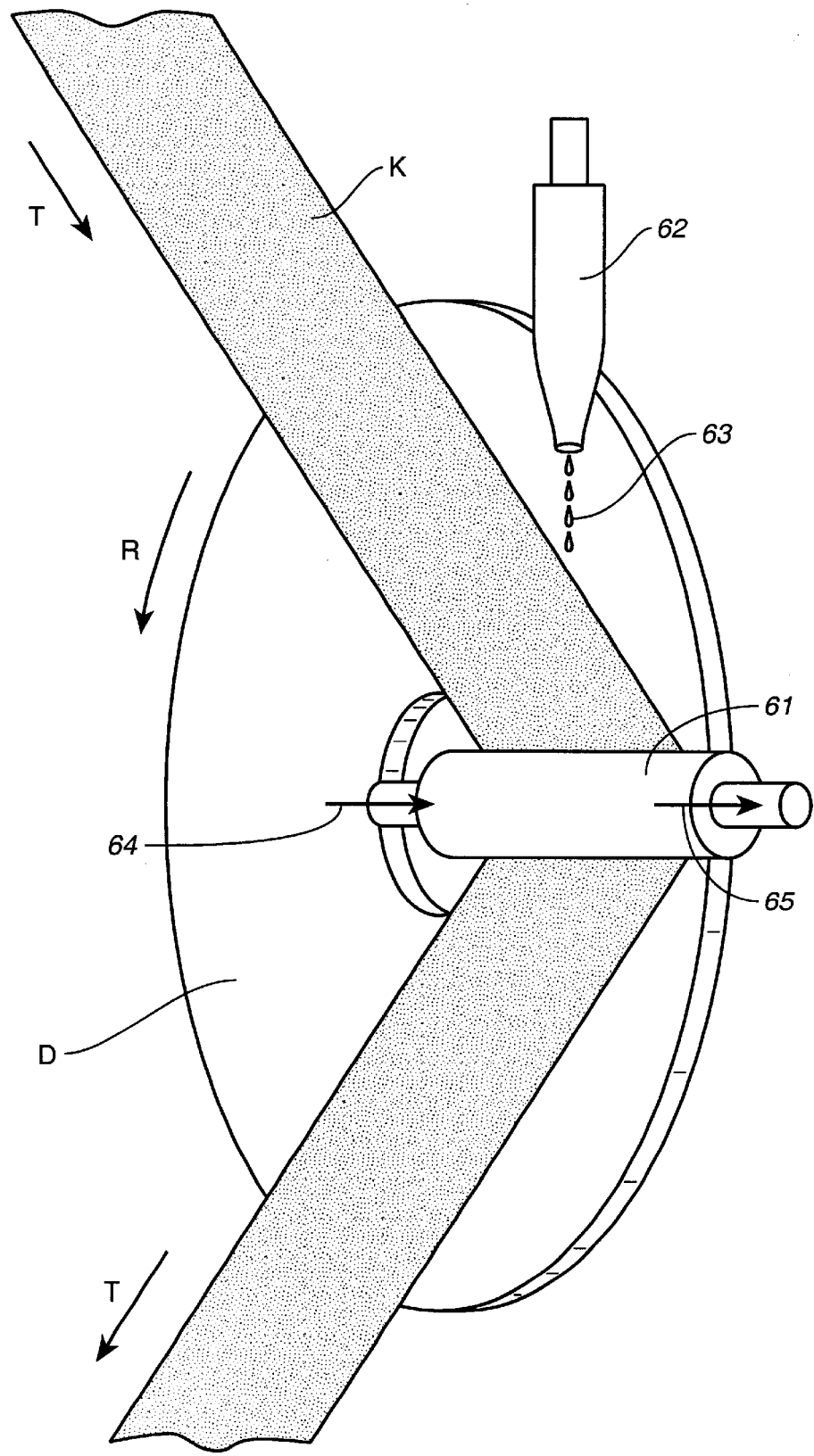
FIG._6

METHOD OF PRODUCING POLISHING CLOTH FOR A TEXTURING PROCESS

BACKGROUND OF THE INVENTION

This invention relates to a method of producing a polishing cloth for texturing the surface of a magnetic hard disk substrate by using free abrading particles.

In general, the texturing of the surface of a disk substrate, say, of an aluminum alloy by means of free abrading particles is carried out by pressing a polishing cloth on the target surface to be polished while supplying onto the surface a liquid slurry serving as the free particles and rotating the disk substrate while adjusting the pressure on the polishing cloth. The liquid slurry may be one obtained by mixing abrading particles of aluminum oxide, silicon carbide or diamond with an aqueous solution containing a surfactant and stirring the mixture together. In the past, woven cloths produced by weaving plastic fibers were frequently used for such a texturing process. Such a cloth may be produced, for example, by weaving both longitudinally and transversely woven bundles of plastic fibers of polyester or tetron and cut in the shape of a circle or a tape.

With the recent increase in the memory capacity of magnetic hard disks, there is a demand to increase the density of various memory media. As a result, it has become necessary to reduce and stabilize the floating distance of a magnetic head over the surface of a magnetic hard disk substrate and the surface texturing on such disk surfaces is required to be ever finer and more uniform than before. By a texturing process with the use of free abrading particles and a polishing cloth as described above, however, abnormal protrusions, waviness and irregular patches are generated on the textured surface and it was not possible to carry out a fine and uniform texturing of a surface of a magnetic hard disk substrate. In other words, it has been very difficult to reduce and stabilize the floating distance of a magnetic head, and this has been a cause of collisions or adhesion between the magnetic head and a hard disk.

Next will be explained the reasons for finding abnormal protrusions, waviness and patches on a textured surface of a magnetic hard disk substrate. FIG. 2 shows the conditions of a polishing surface of a conventional polishing cloth 20 produced by weaving woven bundles 23 of plastic fibers longitudinally and transversely to serve as its base 21 having a polishing surface 22. As can been seen in FIG. 2(a) in which a small portion B of the polishing surface 22 is enlarged, the polishing surface 22 of a prior art polishing cloth 20 has many protrusions and indentations. If a polishing cloth with such protrusions and indentations on its polishing surface is used in a texturing process by means of free abrading particles, the target surface to be polished experiences compressive forces of different magnitude, depending on whether it is being pressed by one of the protrusions or indentations on the surface of the polishing cloth. The liquid slurry which is supplied onto the target surface will not be pressed uniformly, and patches are finally left on the finished surface. As a result, abnormal protrusions may be formed on the surface of the disk substrate or a waviness may be generated. Grooved lines cannot therefore be formed at a high density, and it is concluded that prior art polishing cloth is not suited for a fine and uniform texturing process.

With the recent increase in the demand for magnetic hard disks, it is also coming to be severely required to shorten the time spent for the texturing of magnetic hard disk substrates and to thereby increase the throughput.

SUMMARY OF THE INVENTION

It is therefore an object of this invention to provide a method of producing an improved polishing cloth with which the surface of a magnetic hard disk substrate can be finely and uniformly textured.

It is an additional object of this invention to provide a method of producing an improved polishing cloth with which the time required for texturing a disk substrate can be shortened such that the production throughput can be improved.

A polishing cloth embodying this invention, with which the above and other objects can be accomplished, may be characterized as comprising a base material of a woven cloth formed by weaving in woven bundles of plastic fibers having a surface layer formed by portions of these woven bundles which are cut and raised so as to stand up from a surface. Such a polishing cloth can be produced by preparing a woven cloth as its base material by weaving in woven bundles of plastic fibers, cutting portions of these woven bundles over a surface of the woven cloth, and forming a surface layer by raising the cut portions of the woven bundles from a surface. When such a polishing cloth is used for texturing a target surface of a disk substrate, the target surface is rubbed with such a cloth while a liquid slurry containing free abrasive particles is supplied to the surface. With a polishing cloth according to this invention, the target surface can be pressed more uniformly and gently and the removed particles from the target surface can be effectively captured inside the surface layer with raised plastic fibers.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIGS. 1(a-1) and 1(a-2) are a diagonal external view of a polishing cloth embodying this invention and an enlarged view of a portion thereof, and FIG. 1(b) is a microscopic photograph (magnification=200 times) of its polishing surface;

FIGS. 2(a-1) and 2(a-2) are a diagonal external view of a prior art polishing cloth and an enlarged view of a portion thereof, and FIG. 2(b) is a microscopic photograph (magnification=200 times) of its polishing surface;

FIGS. 3(a) and 3(b) are respectively a microscopic photograph of a surface of a magnetic hard disk substrate after undergoing a texturing process by using a polishing cloth embodying this invention and a prior art polishing cloth;

FIG. 4 is a graphical representation of the results of measurements of stock removal in test and comparison experiments;

FIG. 5 is a graphical representation of the results of measurements of surface roughness in test and comparison experiments; and FIG. 6 is a schematic sketch of a texturing machine used in the test and comparison experiments.

DETAILED DESCRIPTION OF THE INVENTION

FIG. 1(a) shows a polishing cloth 10 embodying this invention, comprising a base material 11 made of a woven cloth formed by weaving in woven bundles of plastic fibers and a surface layer 12 formed over the surface of this base material 11 comprising parts of the plastic fibers 13 formed by cutting parts of the woven bundles and raising them to stand up over the surface.

According to a method of production embodying this invention, a woven cloth is prepared first as the base material of the polishing cloth by weaving in woven bundles (as indicated by numeral 23 in FIG. 2) of plastic fibers both longitudinally and transversely. Examples of the fibers may include one or more kinds of plastic fibers such as polyester and tetron fibers with diameters in the range of 0.01–0.50 deniers. Next, portions of the woven bundles of these woven bundles at the surface are cut and these cut portions of the plastic fibers 13 are raised all over the surface of the woven cloth, thereby forming a polishing surface as can be shown in a portion indicated by symbol A and enlarged in FIG. 1(a), as well as in FIG. 1(b) by a microscopic photograph. One of the methods for forming such a surface layer 12 is to rotate a roller having many spike-shaped protrusions on its surface near the surface of the woven cloth to thereby cut portions of the woven bundles of the plastic fibers on the surface of the woven cloth and to simultaneously raise these cut portions of the plastic fibers. The woven cloth thus prepared is finally cut into a desired shape such as a circle or the shape of a tape.

According to an embodiment of this invention, the polishing layer of a polishing cloth as described above is pressed against the target surface of a magnetic hard disk surface to be polished and, as a liquid slurry serving as free abrading particles is being supplied, the target surface is rubbed with the polishing cloth with the liquid slurry caused to be present between the surface layer of the polishing cloth serving as its polishing surface and the target surface of the disk substrate to be polished.

The invention is described next by way of the experiments carried out by the present inventors both according to the present invention and as comparison experiments.

As an example of polishing cloth embodying this invention, a polishing tape was produced by using a woven cloth produced as a base material by weaving woven bundled of polyester fibers with thickness 0.06 deniers (diameter=2 $\mu$m) both longitudinally and transversely, cutting a portion of the woven bundles on a surface by means of a spiked roller and raising the cut portions of the plastic fibers over the surface of the cloth and thereafter cutting it into the shape of a tape.

For the texturing, magnetic hard disk substrates were prepared by subjecting aluminum plates to an Ni-P plating process and a polishing process. A texturing machine, as shown in FIG. 6, produced by Nihon Micro Coating, Inc., comprising a rubber roller 61 which is rotatable around a bearing shaft and a nozzle 62 having its outlet pointed to the vicinity of the contact surface between the polishing tape K and the target surface of the magnetic hard disk substrate D to be polished, was used for the texturing. The pressure exerted by the tape K onto the target surface of the disk substrate D can be adjusted by way both of an inner force 64 and an outer force 65 applied to the bearing shaft. The polishing tape K is caused to travel in the direction of arrow T and the disk substrate D is rotated in the direction of arrow R while the inner force 64 and the outer force 65 on the rubber roller 61 are controlled to press the tape K onto the target surface of the disk substrate D and a liquid slurry 63 is dropped through the nozzle 62 near the contact surface between the polishing tape K and the target surface of the disk substrate D.

A texturing experiment according to this invention was carried out by rotating the disk substrate at a rotary speed of 95 rpm, pressing the polishing tape through a rubber roller with hardness 40 degrees by adjusting the inner force and the outer force respectively equal to 1.36 kg and 1.45 kg and causing it to vibrate in the transverse direction (that is, in the radial direction of the disk substrate) with amplitude of 1 mm and frequency of 150 vibrations per minute, while causing it to travel at a speed of 40 mm/minute against the direction of the rotation of the disk substrate. The vibration of the tape in the transverse direction was for the purpose of preventing sudden changes in the surface roughness on the textured disk substrate such that a magnetic head can maintain a steady floating distance over the disk surface. The liquid slurry was a suspension prepared by mixing diamond particles with average diameter 3 $\mu$m and a water-soluble liquid containing a surfactant and stirring the mixture together. The liquid slurry thus prepared was dropped at a rate of 4 cc/minute.

As a comparison experiment, use was made of a prior art polishing tape instead but the texturing was carried out otherwise under identical conditions and by using the same texturing machine as in the test experiment. The results of the test and comparison experiments will be analyzed below.

FIGS. 3(a) and 3(b) are respectively a microscopic photograph of a surface of a magnetic hard disk substrate after undergoing a texturing process by using a polishing cloth embodying this invention and a prior art polishing cloth. They show clearly that the disk surface processed by a cloth according to this invention has fewer patches and is textured more finely and uniformly.

FIG. 4 shows the amounts of stock removal, or the material removed from the surface by the process, per unit time in the test and comparison experiments. It can be seen that the stock removal was greater when the polishing cloth according to this invention was used.

FIG. 5 shows the surface roughness (Ra) of the disk substrates processed in the test and comparison experiments in units of Å as measured by using a probe (Model P-1 with diameter 0.2 $\mu$mR produced by Tencor, Inc.). FIG. 5 indicates that it took 30 seconds by using a polishing cloth according to this invention to attain a surface roughness of 10.0 while it took 90 seconds (or three times as long) to do in the comparison experiment. In other words, the time required for the texturing can be shortened significantly if a polishing cloth according to the present invention is used instead of a prior art polishing cloth.

In summary, if a disk surface is textured by using a polishing cloth according to this invention together with free abrading particles, the entire target surface of the disk substrate is uniformly and gently pressed and hence the abrading particles are pressed more uniformly and gently, and the removed debris particles are captured in the empty spaces in the surface layer comprising raised fibers. As a result, the present invention has the advantages of not forming abnormal protrusions or waviness on the textured target surface, using a liquid slurry more effectively because the free abrading particles contained therein are more uniformly pressed against the target surface to be textured, shortening the time required for the texturing and hence improving the throughput.

What is claimed is:

1. A method of producing a polishing cloth for a texturing process, said method comprising the steps of:
   producing a base material comprising a woven cloth by weaving in woven bundles of plastic fibers;
   cutting portions of said woven bundles of said plastic fibers over a surface of said woven cloth; and
   forming a surface layer of said woven cloth by raising the cut portions of said woven bundles from said surface.

2. The method of claim 1 wherein said plastic fibers have thickness 0.01–0.50 deniers.

3. The method of claim 1 wherein said bundles are woven in both longitudinally and transversely to form said woven cloth.

4. The method of claim 1 wherein the steps of cutting and forming a surface layer are carried out by rotating a roller having spikes thereon near said surface.

* * * * *